(12) United States Patent
Majumdar et al.

(10) Patent No.: US 11,481,456 B2
(45) Date of Patent: Oct. 25, 2022

(54) MODEL AND PATTERN STRUCTURE ONLINE UNITAL LEARNING: MAPSOUL

(71) Applicant: KYNDI, INC., San Mateo, CA (US)

(72) Inventors: Arun Majumdar, Alexandria, VA (US); James R. Welsh, Reston, VA (US)

(73) Assignee: KYNDI, INC., San Mateo, CA (US)

( * ) Notice: Subject to any disclaimer, the term of this patent is extended or adjusted under 35 U.S.C. 154(b) by 1014 days.

(21) Appl. No.: 15/900,543

(22) Filed: Feb. 20, 2018

(65) Prior Publication Data

US 2018/0240043 A1    Aug. 23, 2018

Related U.S. Application Data

(60) Provisional application No. 62/460,570, filed on Feb. 17, 2017.

(51) Int. Cl.
*G06N 20/00* (2019.01)
*G06F 16/9535* (2019.01)
(Continued)

(52) U.S. Cl.
CPC .... *G06F 16/9535* (2019.01); *G06F 16/24578* (2019.01); *G06F 16/28* (2019.01);
(Continued)

(58) Field of Classification Search
None
See application file for complete search history.

(56) References Cited

U.S. PATENT DOCUMENTS

| 7,877,385 B2 | 1/2011 | Craswell et al. |
| 8,755,837 B2 | 6/2014 | Rhoads et al. |
| (Continued) |

FOREIGN PATENT DOCUMENTS

| JP | 2009-140173 A | 6/2009 |
| JP | 2013-536484 A | 9/2013 |
| (Continued) |

OTHER PUBLICATIONS

Distributed Artificial Intelligence for Multi-Agent Problem Solving and Group Learning (M.J. Shaw, B. Harrow, and S. Herman) taken from https://ieeexplore.ieee.org/stamp/stamp.jsp?arnumber=184035 (Year: 1991).*

(Continued)

*Primary Examiner* — David R Vincent
(74) *Attorney, Agent, or Firm* — Oblon, McClelland, Maier & Neustadt, L.L.P.

(57) ABSTRACT

An apparatus and method are provided for machine learning method using a network of agents. The agents are arranged in a network with respective links between pairs of agents, and the links enabling the exchange information. Different agents can apply different reasoning paradigms corresponding to different approaches to machine learning and artificial intelligence. These disparate approaches are seamlessly integrated to aggregate decisions and learning performed using different approaches using an economics model in which a Nash equilibrium is reached through the exchange of information. Each agent selects which other agents to exchange information with by seeking to optimize preference, utility, and objective functions, and these function include how well the agents obtain an assigned goal subject to other desirable features and characteristics (e.g., enforcing diversity).

2 Claims, 4 Drawing Sheets

(51) Int. Cl.
*H04L 41/046* (2022.01)
*G06N 5/04* (2006.01)
*G06F 16/2457* (2019.01)
*G06N 3/00* (2006.01)
*H04L 41/16* (2022.01)
*G06N 20/20* (2019.01)
*H04L 41/147* (2022.01)
*G06N 10/00* (2022.01)
*G06F 16/28* (2019.01)
*G06F 16/901* (2019.01)
*G06F 17/16* (2006.01)
*H04L 67/02* (2022.01)

(52) U.S. Cl.
CPC .......... *G06F 16/9024* (2019.01); *G06F 17/16* (2013.01); *G06N 3/006* (2013.01); *G06N 5/043* (2013.01); *G06N 10/00* (2019.01); *G06N 20/00* (2019.01); *G06N 20/20* (2019.01); *H04L 41/046* (2013.01); *H04L 41/147* (2013.01); *H04L 41/16* (2013.01); *H04L 67/02* (2013.01)

(56) References Cited

U.S. PATENT DOCUMENTS

| | | | |
|---|---|---|---|
| 9,165,040 B1 | 10/2015 | Hajaj | |
| 9,818,136 B1 | 11/2017 | Hoffberg | |
| 2004/0133526 A1* | 7/2004 | Shmueli | G06Q 50/188 705/80 |
| 2010/0317420 A1* | 12/2010 | Hoffberg | G07F 17/323 463/1 |
| 2013/0262285 A1* | 10/2013 | Ferstenberg | G06Q 50/188 705/37 |
| 2014/0032580 A1 | 1/2014 | Majumdar | |
| 2015/0169758 A1 | 6/2015 | Assom et al. | |
| 2015/0356144 A1 | 12/2015 | Chawla et al. | |
| 2017/0111507 A1* | 4/2017 | McGann | G06Q 10/063112 |

FOREIGN PATENT DOCUMENTS

| | | | |
|---|---|---|---|
| JP | 2014-115839 A | 6/2014 | |
| WO | WO-2011160205 A1 * | 12/2011 | G06F 16/36 |
| WO | WO 2016/154460 A1 | 9/2016 | |

OTHER PUBLICATIONS

Data Mining Concepts and Techniques. (Jiawei, H, Kamber, M, Pei, J) taken from http://myweb.sabanciuniv.edu/rdehkharghani/files/2016/02/The-Morgan-Kaufmann-Series-in-Data-Management-Systems-Jiawei-Han-Micheline-Kamber-Jian-Pei-Data-Mining-Concepts-and-Techniques-3rd-Edition-Morgan-Kaufmann-2011.pdf (Year: 2012).*
International Search Report and Written Opinion dated May 14, 2018 in PCT/US2018/018833 (with Search History), 19 pages.
Indian Office Action dated Apr. 30, 2021 in Indian Patent Application No. 201917032365, 7 pages.
Extended European Search Report dated Dec. 1, 2020 in European Patent Application No. 18753710.5, 8 pages.
Office Action dated Oct. 8, 2012, in corresponding Japanese Patent Application No. 2019-543224 with English translation, 8 pages.

* cited by examiner

MODEL AND PATTERN STRUCTURE ONLINE UNITAL LEARNING: MAPSOUL

CROSS REFERENCE TO RELATED PAPERS

This application is based upon and claims the benefit of priority to provisional U.S. Application No. 62/460,570, filed Feb. 17, 2017, the entire contents of which are incorporated herein by reference. This application relates to U.S. Patent Application, "METHOD AND APPARATUS OF RANKING LINKED NETWORK NODES" filed Feb. 20, 2018, the entire contents of which is incorporated herein by reference.

FIELD

The illustrative embodiments described herein relate to learning patterns in interactive networks, and, more particularly, to integrating disparate machine learning methods using an economic model for the exchange of information between agents applying the disparate machine learning methods as reasoning paradigms.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Machine learning and artificial intelligence (AI) technologies have been applied to many different problems and technologies, but conventional approaches have several drawbacks limiting their impact. Whereas the great strength of AI technology is its coverage of nearly every aspect of intelligence, its great weakness is fragmentation. Most AI systems are designed and built from one paradigm. For example, the most well-known AI paradigm today is Deep Learning, a subset of machine learning, which itself is a subset of AI. In the Deep Learning paradigm, multi-layer artificial neural networks ("ANNs") are the most commonly used method, and backpropagation is the most common ANN learning method.

Backpropagation incorporates gradient descent over an error surface in a space defined by the weight matrix. That is, it calculates the gradient of a loss function. Thus, Deep Learning is not straightforwardly amenable to being combined with other AI paradigms, such as logic. The same can also be said of other machine learning methods. That is, they are fragmented such that combining them requires specialized considerations, which are often not robust.

Further, although machine learning methods are good at nuanced classification and prediction, they lack contextual capability and minimal reasoning ability. Conversely, symbolic methods are good at reasoning over defined problems, but have no learning capability and poor handling of uncertainty. If these approaches could be combined, the strengths of one paradigm might compensate for the deficiencies of the other, and vice versa. However, any system that endeavors to combine multiple paradigms requires a great deal of specialized labor to tailor the components, make them work together, and test the many combinations on desired outputs. Even then the result might not be robust to changes.

Unfortunately, conventional methods fail to provide a robust solution to the above challenges.

BRIEF DESCRIPTION OF THE DRAWINGS

A more complete appreciation of the disclosed inventions and the many attendant advantages thereof will be readily obtained as the same becomes better understood by reference to the following detailed description when considered in connection with the accompanying drawings, wherein.

DETAILED DESCRIPTION

Figure 1:
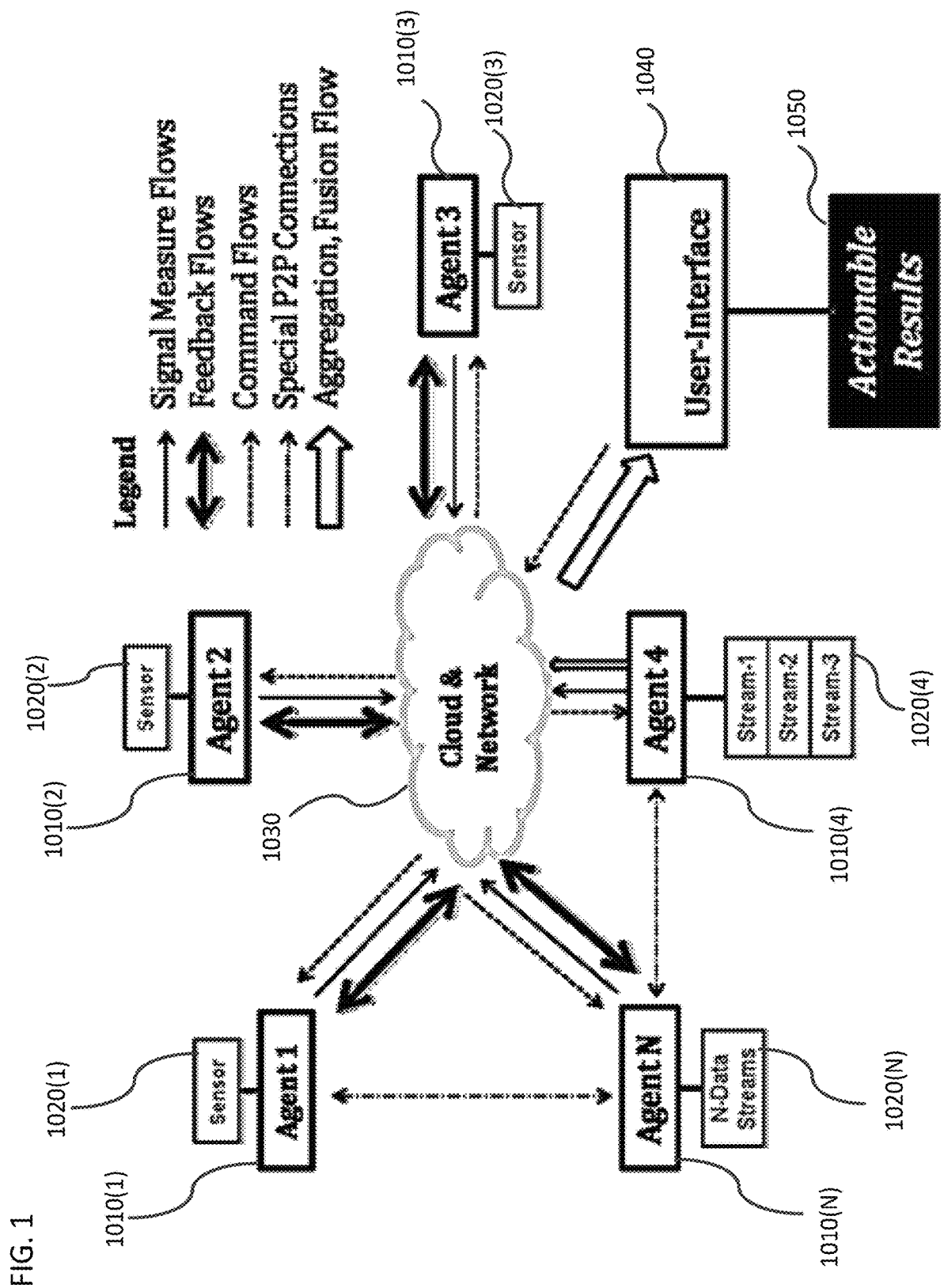
FIG. 1 shows an example of a network of software agents, according to on implementation.

The methods and apparatus described herein overcome the above-discussed deficiencies in conventional methods. For example, the methods described herein provide an approach to machine learning that can straightforwardly and robustly be integrated with symbolic methods and other machine learning methods. In certain implementations, the methods described herein provide an approach to machine learning that efficiently combines multiple AI paradigms into a flexible, fault-tolerant system. The ensemble/network of different algorithms, which are referred to as agents, is controlled by concepts from economics, including (i) a preference function, (ii) a utility function, and (iii) an objective function. Each agent is endowed with a reasoning paradigm (e.g., belief network, decision tree, etc), or preference function. Based on the agent's respective reasoning paradigm or preference function, the agent then seeks to optimize an objective function (e.g., profit, utility, reward functions, etc.), assigning a real number to its preferences. Using training data, the agents learn by interacting with other agents in the ensemble/network in accordance with the principles of game theory. Viewing these interactions between agents in the context of a game, it is understood the agents will converge to a Nash Equilibrium. The Nash Equilibrium represents the stable point of an agent in a decision landscape based on the training data and the agent's method for reasoning and classification over that data. This stable decision point can be considered as the state vector of a learned state of the agent in that space.

Further, this learned state can be used as an index over learned data without needing to store the original data itself. In fact, the learned state can be treated as a single model that can be saved, stored, retrieved, used, or even re-combined with other diverse or similarly learned models to a size and depth limited by the users' choices of learning parameters. For example, a learned state captured at a given time can use the surrogate ranking operator (SRO) described herein, and is described in more detail in U.S. Patent Application Publication No. and in Provisional Patent Application No. 62/460,570, both of which are incorporated herein by reference in their entirety.

Because the agents interact based on an economics model using a common "currency," different, various different AI paradigms/models can be seamlessly and robustly integrated. Further a hierarchy of agent networks can be created in which a smaller economy of interacting agents at one level can be bundled as a single agent having a collective output that interacts at a second level within a larger economy of other agents at the second level, as described for example, in U.S. patent application Ser. No. 14/965,728 and U.S. patent application Ser. No. 14/971,769, both of which are incorporated herein by reference in their entirety.

As discussed above, conventional methods in contrast to the methods described herein, unavoidably have several intrinsic deficiencies, including, e.g.:

(1) Inadequate information due to missing model variables and relationships;
(2) Intrinsic data revisions over short to longer time periods; and
(3) Fluctuations and disturbances that while weak may have significant impacts.

The methods described herein overcome these deficiencies by virtue of the attributes discussed below. For example, methods described herein provide a unital learning model that addresses these deficiencies by building a flexible, fault-tolerant system, adapting to data revision while maintaining sensitivity to weak signals in the data. Additionally, the machine learning procedure exhibits fast convergence to a learned state and ease of implementation, speed, and handling of complexity. Further, the same can be said of the ranking operator synthesis methods (e.g., the method for generating the SRO). The methods described herein provided a model that is "unital" because it relies on unitary bistochastic matrix structures.

The term "unital" is used extensively in abstract algebra to refer to an algebraic structure which contains a unit. The term "unital," as used herein, also refers to such a structure, but one which is internally composed of non-identity units (i.e., heterogenous players representing properties of data) to the input data to avoid models that consist of identities to the data (i.e. the trivially learned model whose size is identical to the size of the input data). Accordingly, as used herein the recited "unital model" is a network of various algorithms that interoperate and cooperate by using a common perceptual language (e.g., the economic model of exchanging information among agents as a common currency) to learn patterns that approximate input data to arbitrary precision, fidelity, and accuracy.

Figure 2:
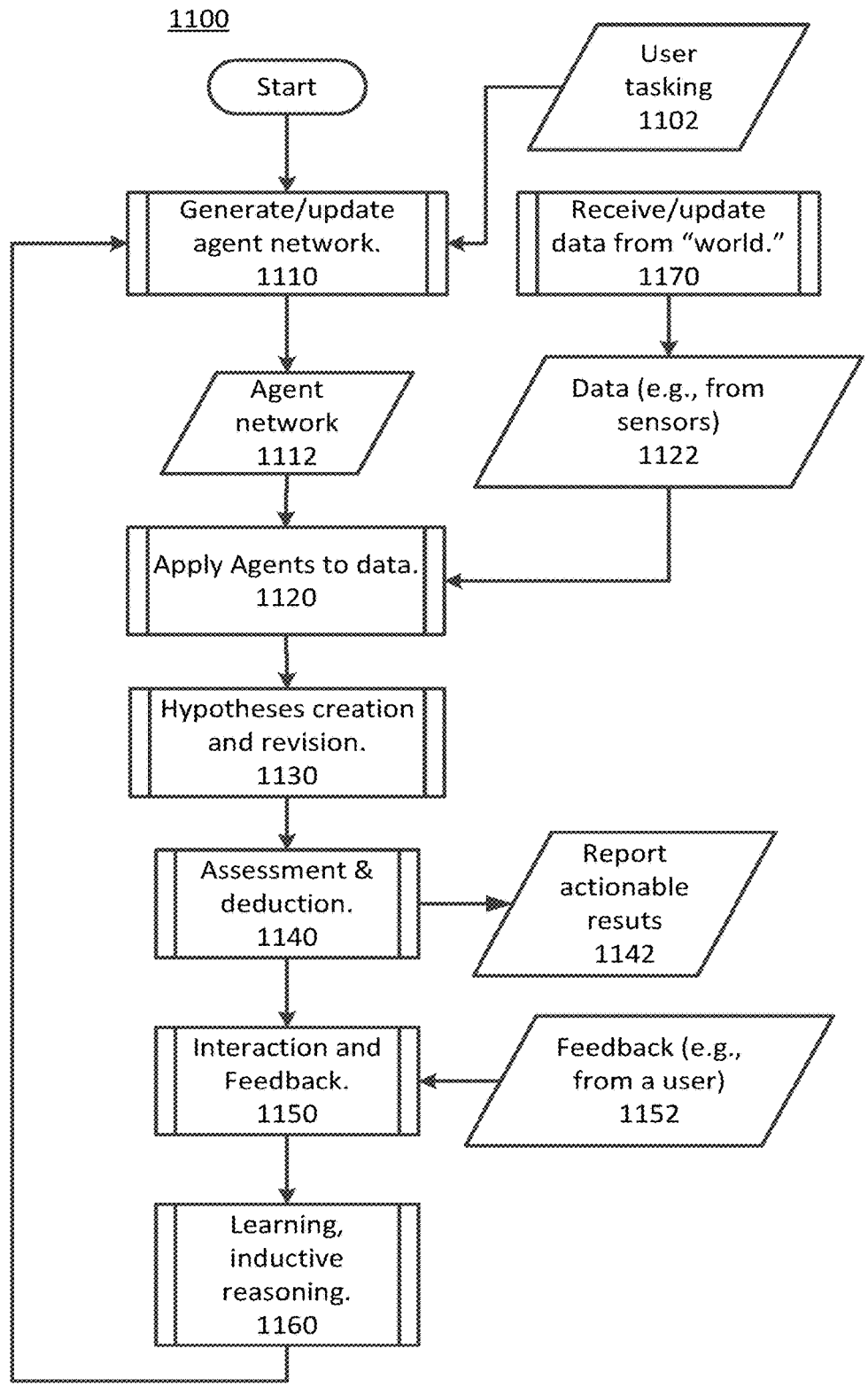
FIG. 2 shows an example of a flow diagram of a method of agent learning in a network, according to on implementation.

Referring now to the drawings, wherein like reference numerals designate identical or corresponding parts throughout the several views, FIG. 1 shows a schematic diagram of a network 1000 of agents 1010(1) through 1010(N). As shown in FIG. 2, the agents 1010(1)-(N) can communicate via a communication network 1030, and, in certain implementations, the communication network 1030 can be configured to have a cloud-based architecture or can be implemented on any other computational or communication architecture. At the lowest level, agents receive information about and perceive the "world" through respective sensors 1020(1)-(3). At higher levels, agents receive data streams 1020(4)-(N) from lower level and/or similar situated agents. For example, if the agents analyze a text stream they would receive a series of words and processes these to generate a signal/signature representing the perception of the data from the vantage point and preferences of the agent. The agents can express their preferences for particular types of information by exchanging information via metadata exchanges through links to other agents (e.g., via special per-to-per (P2P) connections). Information can also be passed up a hierarchy of agents and aggregated by higher layer level/layer agents until actionable results 1050, such as a report, are generated which can be, e.g., provided to a user through a user interface 1040.

By way of non-limiting example, in certain implementations, the aggregation and distillation of low level data to higher level concepts and meaning is referred to as taking data and generating semenatic atoms called sematons, which are in turn refined and distilled at a higher level in which patterns a discerned in combinations of sematons, which are called Gestalts. Thus, the network of agents learns by synthesizing new patterns or Gestalts within social and cultural contexts. For example, U.S. patent application Ser. No. 14/965,728, which is incorporated herein by reference in its entirety, describes that these Gestalts can be used in novel contexts to identify analogous situations in which the original data no longer appears. This greatly enhances the users productivity because the system draws analogies from user input and creates new possibilities that a single user could not conceive. Accordingly it is possible to use intelligent software agents to form a robust cognitive model that can deal with structured and unstructured data by self-organization into ensembles of classifiers or decision makers. That is, in this non-limiting example, agents are integrated and evolve as a society/network of agents, which occurs at various scales and levels of a hierarchy. For example, agents within a network have respective preference functions, which they seek to maximize through exchanges of information/metadata.

Further, U.S. patent application Ser. No. 14/971,769, which is incorporated herein by reference in its entirety, provides another non-limiting example of agents called hierarchical semantic boundary indices, in which a hierarchy of agents evolves and distills information from various data streams.

As discussed above, by virtue of the interactions among agents, the methods described herein enable a hybrid combination of new algorithms within the framework of multi-agent technology. Thus, applications of the methods described herein can be built based on agents that compute in a society, where a society is a cohesive network. Agents can virtually communicate or move along the vertices of the network they are part of to evolve their configuration space. Agents convert data to decisions, and their performance and efficiency is measured in work using a virtual currency, instead of in direct computation resources.

Further, the agents can use a distributed shared memory model, where they store and extract information using the graph's vertices. The distributed shared memory model's strengths are that it is much easier to implement and maintain (than, for example, centralized models), highly fault tolerant and has high scalability, and the quality of the results it produces is very high, compared to the strongest models of complete knowledge sharing (such as the largest Expert Systems and their associated truth maintenance systems).

Agents have "brains" with capabilities ranging from simple insect-like sensing to high-level reasoning. By collaborating, sophisticated agents can acquire data from simpler agents and work with "colleagues" that use different algorithms: an agent that uses analogy to guess a solution can pass hypotheses to an agent that may verify them by deduction, or to an agent that uses statistics to estimate their likelihood. High-speed perception of intelligence in massive data streams is achieved by indexing the groups of agents that collaboratively sense patterns in data streams.

Using the methods described herein, queries can be answered at the lowest layers using inductive, deductive, and abductive reasoning in a pragmatic cycle, as described below with reference to FIG. 2. The query results are then abstracted, fused, and propagated upward as evidential patterns that higher-level agents recognize. The pattern structures result from the lower-level percepts that are propagated up to the next layer in the hierarchy of agents as signals, which are interpreted as high-level cognitive representations. These representations are percepts that are aggregated into gestalts forming a semantic field-like data representation.

Every agent encapsulates one or more models that generate one or more hypotheses about a theory of the data based on its perceptions from the lower-level agents. An agent chooses those models and hypotheses that it has learned to rate as best suited to its own self-interest in terms of 1) A utility function;
2) An objective function; and,
3) A preference function.

As discussed above, a model can be as simple as an insect-like response in an agent or as complex as a society or grouping of agents together that act as an ensemble classifier, providing percepts on underlying data. Therefore, each individual agent can discover which society of agents it should join based on its own self-interest. In the language of game theory, the agents are presented with a choice (e.g., which agents to exchange information with) and seeks to optimize its self-interest. If after making a choice the agent observes that a different choice would have a more favorable outcome (i.e., better optimize its self-interest) then the agent changes its choice at the next iteration. Eventually, equilibrium will be achieved when no better choice is to be had, and this is called the Nash Equilibrium.

FIG. 2 shows a flow diagram of one implementation, of a network of agents learning and then continuing to adapt to a changing environment. In contrast to conventional method that pipeline machine processing, which can produce overwhelming amounts of irrelevant analysis, the methods described herein enable the network of agents to reflect on its own effectiveness to produce high-quality, insightful information from Big Data. For example, the network of agents uses a model for collaborative intelligence, such as described in M. Minsky, Society of Mind, Simon and Schuster (1988), which is incorporated herein by reference in its entirety. In this model, a collection of autonomous and modular components have localized capabilities for perceiving and reasoning. Further, this model assumes that, in the aggregate an ensemble of simple decision makers, can supersede the performance of any subject matter expert(s) in problem solving. The gestalt principles discussed above for hierarchical re-representations are used to map from low-level data to high-level concepts and patterns.

In FIG. 2, when the system is first launched, agent populations 1112 are initiated/created (and then latter updated) in process 1110, and the system is ready to start receiving inputs from sources connected to the data sources (e.g., the sensors and data streams in FIG. 1). The overall goal is set by the task assigned by a user (i.e., the user tasking 1102). That is, even though a system is receiving data 1122, it does not do anything without the initial human operator input goal (i.e., the user tasking 1102). Therefore, in certain implementations, method 1100 begins with the analyst providing the user tasking 110. For example, at process 1110 of method 1100, the analyst has tasked the agents with a specific business requirement, such as "identify rogue traders" from sources that may include single or multiple rooms and threads of conversations in chats, tweets, blogs, enterprise email, and messaging. The system of agents immediately responds to the request by providing relevant evidential signal schemata and related measurements that were learned earlier from a training period via sample inputs. Therefore, at s process 1120 of method 1100, the agents apply the evidential signal measures to the language streams in the environment that generate a collection of "percepts" that, in aggregate, form a "perception." Percepts at the simplest level are correlations between evidential signal measures and language streams.

In process 1130 of method 1100, the agents act on the perceptions in an abductive process that seeks to explain the "meaning" of what is being perceived by combining background knowledge (which includes heuristics) to synthesize a working "hypothesis." At one extreme end of the scale, when there is total knowledge, the hypotheses fit a known model, while at the other extreme there is no background knowledge and, hence, the system randomly connects percepts into hypotheses by a random process of hypothesis selection. Once a hypothesis has been formulated, the pool of hypotheses is revised. This pool can include user input or feedback and machine learning. The system will usually require feedback from the user if there is no background knowledge available. The feedback is used to generate a relevance constraint to prune out useless conjectures or hypotheses by a competitive mechanism. The revision stage is one of the most complex stages of the system, because it involves using a suite of economic models to assess the "survivability" and, therefore, the plausibility of the hypotheses. During process 1130, agents can trade evidence and hypotheses, then auction off their results. Feedback or other signal measures (from a prior learning process) alters the selection of plausible hypotheses.

In process 1140 of method 1100, the hypotheses are combined/aggregated into a deductive theory that is then used to form a prediction. In our example case, since the analyst requested "Rogue Traders," the system will output its response. At this stage, the response may remain internal to the system or, if the model outputs a sufficiently high relevance score, the response is output as a report to the analyst. Before we consider analyst feedback to the report, let us assume that the system maintains the report "internally" as an ongoing hypothesis because the relevance score was below an analyst's defined threshold value (i.e. that there is insufficient evidence to confirm any claims). At this stage, the system will look for more data to confirm or disconfirm claims.

In process 1150 of method 1100, the network of agents can sample further input and, by feedback on itself. For example, in certain implementations the feedback source can be an analyst/user and/or new input data (e.g., from sensors, a stock market ticker, etc.), and the network of agents can assess the interaction of its partially formed theories using the feedback and alter its theories accordingly.

Regardless of the source of the feedback, in process 1160 of method 1100, the system can learn from the feedback or interaction with data and produce new findings. These findings can prompt new additions to the active agent pool, when method 1100 cycles back to process 1110. The learning and inductive reasoning process in process 1160 augments the pool with new evidence and partial structures that can then feed into another iteration of method 1100. Thus, method 1100 can continually and dynamically adapt to a changing environment. In certain implementations, method 1100 can also include conditional stopping/output criteria, and the operational cycle continues until sufficient evidence, e.g., above a threshold value, triggers the stopping/output criteria, resulting in the generation of a report (or prediction) to the analyst/user.

In view of the above, it can be appreciated that the methods described herein (collectively referred to as the "Model And Pattern Structure Online Unital Learning" (MAPSOUL)) is a computational model for organizing a diversity of data processing algorithms which are represented as players. The ability to organize the players into a workflow in which it is the group of players that produces the capability, not any single player on its own, is what enables MAPSOUL to perform deep pattern learning and pattern recognition. This is achieved in part because MAPSOUL's interpretations are grounded in the assumption of operationally incorrect data and miss-specified algorithms that recast as self-interested players in a general sum game, in which the players are seeking the "truth". MAPSOUL represents a collection of players as a graph of their connectivity based on their preferred communication patterns to each other and to a special player designated as the "manager". Relationships between players as well as their membership in the collection evolve according to whether as individuals, the players are profitable, break-even or unprofitable. Every turn of a play between players is characterized by all players using their prior state and the current data to make a decision to either buy, sell, or hold a fragment of knowledge that they gain from the data. Each player is characterized further by the graph of its developing knowledge at each play. MAPSOUL replaces the usual payoff computations by taking a combination of the graph spectra of their plays. In this way, a player is abstracted as a time evolution of its graph spectrum. These graph spectra are based on the decisions which are economic choices and therefore, can reach a fixed-point where the player has no incentive to change a decision position. The fixed point is a Nash Equilibrium.

In certain implementations, different hierarchical levels of agents can have qualitatively different types of optimization criteria. For example, at various levels the agents can seek to satisfy conditions of diversity, agreement with training data (e.g., the gold standard), providing a high amount of pointwise mutual information to higher-level agents, etc.

MAPSOUL machine learning leverages Nash equilibrium conditions, which are specified using a non-dimensional number concept, much like the way non-dimensional numbers are represented in empirically measured physical systems, such as the Froude or Reynolds numbers. Various non-dimensional numbers used in determining the relative merits of a choice to exchange information are described below with reference to FIG. 3. A non-limiting example of process 1130 is now provided, according to one implementation.

First, consider a data set, D, which is training data. Every player (as used herein the term "player" and "agent" are interchangeable) will be given a goal. For example, this goal may have been set by a user of the system as a machine-learning test set (i.e. gold-standard data) for the player to produce a reference set of vectors. That is, the goal for the player can be to operate on the data set D and thereby produce a vector of values from the data D, which as closely as possible matches the reference set of vectors (i.e., the gold standard or training data). In certain implementations, this vector valued representation of the data D produced by the player can be a complex valued vector. In certain implementations, a pattern vector (PV) can be calculated from this vector valued representation, which is referred to as a preference vector. As described for step 1220 of process 1130, the PV can be understood as representing percepts from the point of view of the agent relative to the positions of other agents.

Second, vector valued representation is categorized (possibly incorrectly categorized) into a cluster. Further, for each of the n known positive-examples of data of the given dataset D, each player may have one or more vectors of the same datum.

Third, the player will have a sensitivity threshold set whereby a vector on a datum is considered identical to another datum vector if their cosine measure does not differ by an amount less than or equal to the threshold value.

This process can be understood as analogous to co-occurrence vectors based on term-term matrices used in vector semantics (e.g., to calculate similarity as a cosine between the pointwise mutual information measure (PMI), treating different terms—analogous to metadata tags or connections between agents—as context), as described in available in D. Jurafsky and J. Martin, *Speech and Language Processing*, 3rd Ed. (Draft), web.stanford.edu/~jurafsky/slp3/ed3book.pdf, which is incorporated herein by reference in its entirety (and especially in chapter 15 describing vector semantics). For example, in certain implementations, agent can reference particular positions of a data stream, which has been tagged with metadata, and the links between metadata tags can correspond to connections between respective agents. Thus, like a term-term matrix used in vector semantics to measure frequencies between word pairs within a given distance, the matrix representation of the vectors of agents can represent a frequency of meta-data tags occurring within a certain number of links of the agents (i.e., the connectedness of agents and their proximity).

Figure 3:
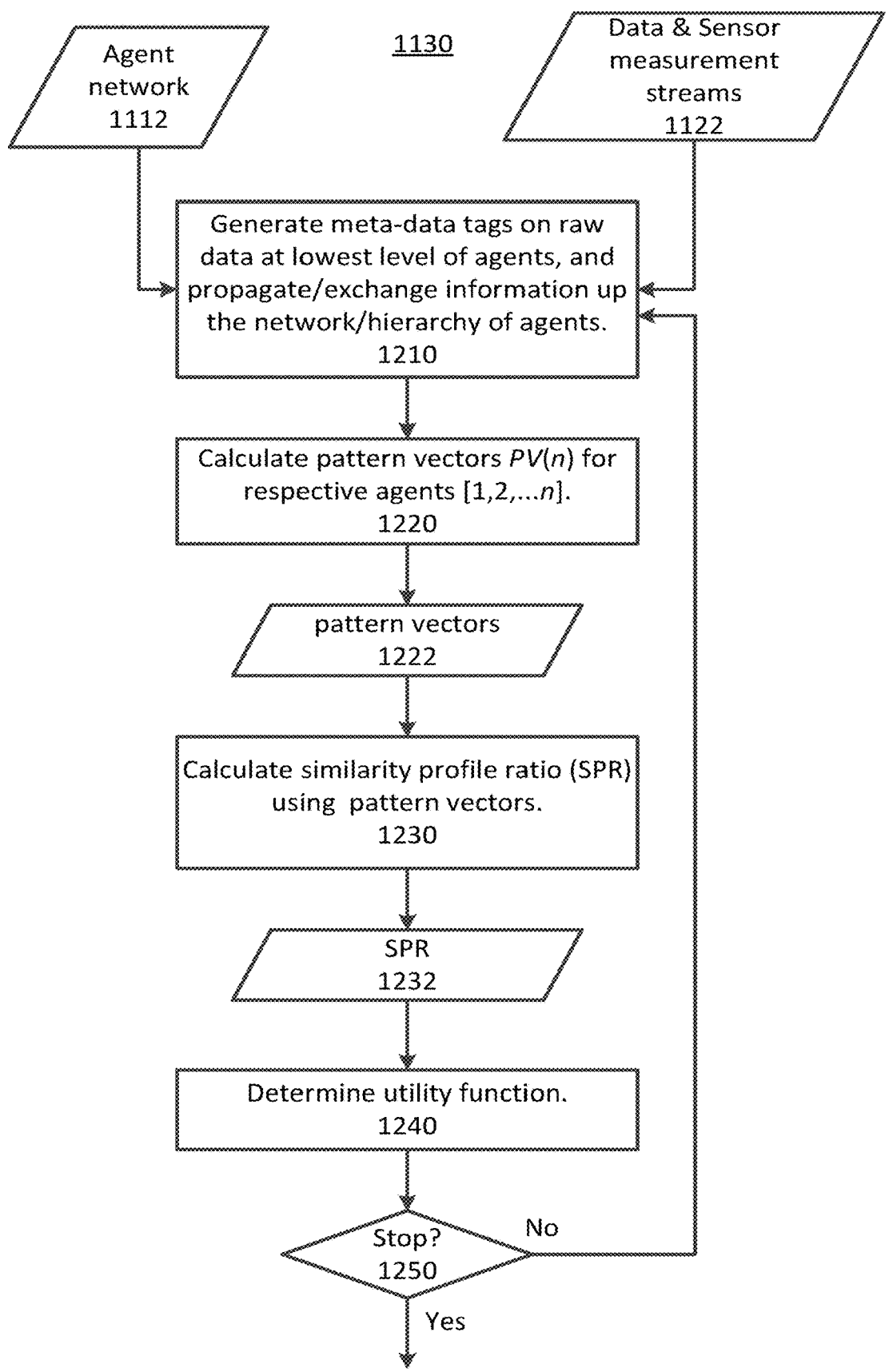
FIG. 3 shows an example of a flow diagram of a process of an agent generating and revising a hypothesis using preference, objective, and utility functions, according to on implementation.

Each of these calculations is described below in greater detail with reference to FIG. 3.

The learning process occurs because the links between agent can shift or be deleted or be added. In the case of a stable network (where things remain the same for a number of cycles) then that state is the learned state. In economic terms, the learned state has achieved a Nash equilibrium. Training data is used to learn the network in which no agent is incentivized (by the utility function) to change its connections with any other agent with respect to the data. This fixed point is usually set as a parameter in terms of the number of cycles of computations (e.g. of 3 iterations if nothing changes then consider that the learned state). When the system is first initialized agents are allocated randomly to the data.

Note that goals are themselves properties of the Utility function. Objective and Preference functions adjust what the agent values that tends to optimality as the agent (usually randomly) explore its data using these functions: the agent only does well if it reaches an equilibrium in the network (Nash).

Training data set the data and the meta-data, and the goal is usually a human provided expected intended result or interpretation: it is this that is learned by the network. The network is dynamic because agents can change their positions or relations with others until it is no longer optimal for the agent to change its position. At that point the Nash equilibrium has been achieved FIG 3. shows a flow diagram of process 1130 to formulate and revise hypothesis from the provided data. As discussed above, the agents make choices based on their respective perceptions from the lower-level agents and based on chosen models and hypotheses that are learned according to the agents self-interest in terms of
1) A utility function;
2) An objective function; and,
3) A preference function.

In step 1210 of process 1130, the data is mapped into a domain independent form by applying metadata tags to the received data. That is, a preference function is assigned to an agent, and the preference function maps metadata to data. According to certain implementations, for any input data, a most general metadata type is assigned to each input data. There are 5 main classes of top-level metadata types defined for any player. These are (i) donor; (ii) acceptor; (iii) negators (iv) positors and (v) logical types (prepositional relators, implicators, as well as first-order logic "and" and "or" operators). These types can be complemented by any subtype structure the user may wish to add, such as linguistic case roles or themes or image descriptors in the case of visual input or audio descriptors in the case of audio inputs.

For example, in the case of natural language input, nouns identified in a sentence input can be tagged with the metadata type "donor". In the same input sentence, the identified verb can be tagged with the metadata type "acceptor". Adjectives/adverbs can be tagged as negators/positors by using these terms to mean their polarity from a sentiment or judgment point of view (according to a human). Logical types can be used to tag prepositions and other functional words. The result is a graph of the sentence labeled by the tags.

Example #1: "John Went to Boston"

In this example we will label (with some external labeling oracle) the sentence using the metadata tags: $donor_{John}$ $acceptor_{went}$ $logical_{to}$ $donor_{Boston}$ In another example, in the case of image input and other types of data input, the concept of "donor" in an image scene can be the representative of the lighter reflective regions while "acceptors" can be representative of the darker non-reflective regions while their subcomponent parts (sub-image regions) can be represented combinations of the other types of tags. The result is a graph of the image labeled by the tags.

The domain dependent process, therefore, results in metadata tagging using the restricted set of top metadata types (the set of 5 top types) and any subtypes which is represented as the graph or trees of the types are induced by the data.

In step 1220, the pattern vectors 1222 of the respective agents are calculated as follows:
1) The distance between two tagged parts (a pair) is defined as the minimum number of connecting links between the pair (intervening links built between their intervening tagged data). Let this number be called "n".
2) Create a frequency and link distance matrix by counting how often each pair of top-level metadata types are found each at a distance smaller than a given "n" (frequency, "f" versus link distance, "n") for a set of players exchanges (in time, t) as their preferences may change over time.
3) Interpret the matrix as a set of vectors called the preference frequency correlation vector (PFCV) as: n*f
4) Normalize the PFCV values by dividing each entry of the vector by the total number player exchanges within the timeframe: NPFCV=(n*f)/(exchanges)
5) Compute the global vector as the logical "or" of the preference vectors, NPFCV.
6) Finally, for the manager of the collection of players, compute the preference inverse frequency correlation vector: PIFCV=NPFCV/players.

Returning to Example #1: "John went to Boston"
$donor_{John}$ $acceptor_{went}$ $logical_{to}$ $donor_{Boston}$ The number of adjacencies between John and Boston (i.e., from donor to donor) is 3:

Here is the enumeration of the 3: [john,went], [went,to], [to,boston]

We call the number 3 the link-distance and therefore we count link distances at 2 and 1 respectively for the combinations of types instead of words. Hence, donor to donor has a link-distance of 3.

Here is a partial matrix representation of the vectors:

|  | (donor/ acceptor) | (donor/ logical) | (logical/ acceptor) | (donor/ donor) |
|---|---|---|---|---|
| Distance = 1 | 1 | 1 | 1 | 0 |
| Distance = 2 | 1 | 1 | 0 | 0 |
| Distance = 3 | 0 | 0 | 0 | 1 |

This results in a pattern vector (sums of columns)=(2, 2, 1, 1) for the meta-data pattern=[(donor/acceptor), (donor/logical),(logical/acceptor),(donor/donor) For each player we define the pattern-vector for inputs as:

$$PV(n) = \frac{1}{D}\sum_{i}^{D}\sum_{j}^{D}\delta_{ij,d}^{T}$$

The n-th player is given by "n" and D is the total number of data (in the case of the sentence, there are 4 words in "John went to Boston"). The i-th metadata and j-th metadata tag distance matrix is computed, their sums taken and divided by the total number of data, D.

For the example, PV(1)=¼ *(2,2,1,1)=(0.5, 0.5, 0.25, 0.25).

For a number of different players, all under the same manager, we have:
PV(Manager)=PV(n)|PV(n−1)| . . . PV(1),
wherein an "or" operation performed on decimal numbers returns a maximum value of the decimal numbers. Similarly, an "and" operation performed on decimal numbers returns a minimum value of the decimal numbers returns a minimum value of the decimal numbers.

Accordingly, the PV can be understood as representing percepts from the point of view of the agent relative to the positions of other agents. Since agents are nodes, it is simply a kind of fingerprint computed for each node in the network. Each node will have slightly different values though some may have the same values (because their local neighborhood is that same as the local neighborhood of another agent). For example, the PV(n) is a path matrix that is stated from "point of view" of the n-th agent. Accordingly, in the example considered below the "point of view" (e.g., preferences) of the agent that references the first position (i.e., n−1) are characterized using a matrix representation of:
(donor/acceptor) (donor/logical) (logical/acceptor) (donor/donor)
Another agent corresponding to n=2 references the second position, which is an "acceptor". Hence, it would be characterized using a matrix representation:
(acceptor/logical) (logical/donor) (logical/acceptor) (acceptor/donor)

Accordingly, different agents reference different positions, have different points of view, and consequently produce different vector representations.

In step 1230, a similarity search is performed over the preference vectors and the result is used to calculate a Similarity Profile Ratio (SPR) 1232. The similarity search is illustrated using the non-limiting example of using a Multi-Vantage-Point (MVP) Tree, but any known method of performing a similarity search can be used.

Recall that the data set D was provided together with a reference vector and that vector valued representations (PV) are categorized into clusters (e.g., using a similarity search). Further, for each of the n known positive-examples of data of the given dataset D, each player may have one or more vectors of the same datum.

In certain implementations, the step of clustering is performed by storing the preference vectors in an MVP Tree. The objective function measures agreement between players and data. A similarity search is performed between player-to-player data using the MVP-Tree. Hence, there are n similarity searches (one for each player's datum) where each of the known positive examples in turn, is the query structure from the player to the MVP tree to return its nearest neighbours as a similarity score. The result is effectively a pair-wise similarity of the respective players. Each data used in the pair-wise similarity is marked off in the MVP tree.

Next, any unmarked remaining data is then used to compute an additional pair-wise similarity score against all the remaining marked data examples (n−1) and all negative-examples of the filtering database (no match similarity—since these are outside the threshold of the nearest neighbors search).

This procedure yields n similarity ranked lists that are fused into a final similarity ranked list that incorporates the rankings of the n individual lists.

The vectors are then used to compute an objective function called the Similarity Profile Ratio (SPR), over time, t. This objective function results in a profile of temporal evolution of non-dimensional numbers because they are computed by the ratios:

$$SPR(t) = t \cdot \left( \frac{\left(\frac{S_{Positive}}{S_{Total}}\right)}{\left(\frac{P_{Positive}}{P_{Total}}\right)} \middle/ \left(\frac{Q}{R}\right) \right) - SPR(t-1),$$

wherein, at initial iteration time t=0, SPR(t−1)=0. The argument $P_{total}$ is the total number of both positive and negative examples recognized and categorized or not recognized respectively by the player with respect to a goal (i.e. a target category). The value $P_{positive}$ is the number of positive examples correctly categorized by the player on the dataset. The value $S_{total}$ is the total number of input-data examples in the currently processing dataset. The value $S_{positive}$ is the number of positive examples found in the currently processing subset. The value Q is the number of positive identifications of the algorithm in a random trial referenced to a human player that plays the role of a gold standard of truth. The value R is the total number of examples available in a random trial on the algorithm. Some algorithms will have a ratio where Q/R=1.0 (e.g., those that identify one category of data versus another category of data) and others will have a ratio less than this depending on semantic complexity (e.g., identify a pattern that correlates to two different data categories).

Any method that is superior to a random selection of answers to a query returns an SPR>1.0. This is, therefore, a measure of how well the system performs its categorizations versus random guesses (i.e., like a monkey and dartboard analogy).

The SPR 1232 has an upper limit. This upper limit is in proportion to the fraction of positive-examples in the dataset and player quality (equalling human performance). The limits are reached when the SPR 1232 reaches a fixed upper bound. The number of iterations, in time, required for the SPR 1232 to reach its upper bound is interpreted as the efficiency of the collection of players performing the categorization and agreeing on the categorization.

Comparing several different players is meaningful if they are carried out only with the same dataset, as it makes no sense to calibrate players against data that randomly vary.

In step 1240, the utility function is calculated. Utility functions are often defined in terms of distance metrics such as cost or travel time, for example. In the case of the Euclidean distance metric as a utility function, the assumption is that feature vector semantics represent objects homogeneously in the same way. For an evolving system with multiple types of metadata that may not easily map one to the other because of deep domain disparities, the utility function defined herein will be able to produce a useful measurement even when there are such incommensurate semantic representations (i.e., the metadata are not homogeneous representations). The utility function is a non-dimensional number, a heuristic measure that is based on intuitions about the nature of similarity and analogy. The first intuition is that similarity can be judged between a range from a minimum of zero (totally dissimilar) to 1 (totally similar).

$$S(\rho_i, \sigma_i) = \left(\frac{1}{e}\right) * e^{\sum_i^n (\rho_i * \sigma_i)} / e^{\sum_i^n ((1-\rho_i)*\sigma_i)}; \rho_i \le 1 \wedge \sigma_i \le 1$$

In order to measure similarity, we choose two different players, A and B:
1) $\rho_i$ is the value of the i-th element of a PV for player-A using its semantic basis of metadata; and,
2) $\sigma_i$ is the value of the i-th element of a PV for player-B which is derived from its basis of metadata not necessarily the same as player-A.
3) n is the cardinality of the maximum link distance of the metadata (if one metadata has greater dimensions then the common lesser is used).

The second intuition is that correlated data, despite differences in metadata, could be evaluated if the value p is defined as the expectation of the presence of features in σ (i.e., if both ρ and σ are correlated data). This results in high scores, which we use to identify clusters with many features in regions of query data that have high probabilities to the neighboring correlated data from other players. However, as a third intuition, it is also important to penalize the presence of player-pairs in regions with very low probabilities. In this case, the denominator weights the presence of pairs with the inverted probabilities of the data in the cluster (i.e., a model of several data elements explaining a semantic feature of interest).

Therefore, we define that the SPR 1232 is used to choose the appropriate metadata tags that can be compared between players, else the probabilities will distribute randomly and the clustering will be "smeared" out in the regions (i.e., they will fail to reliably identify mutual correlated semantic categories). It is important to choose high diversities between players so that their maximum mutual potential for high fidelity data categorization is optimal. For example, the intuition that Marvin Minsky stated in his work on Society of Mind is the principle of diversity. MAP SOUL includes a diversity enforcer that randomly samples data and rejects players for learning on that data based on a user-defined threshold for diversity which in turn is itself based on the intuition that high diversity is an indicator of perception power. When calculating diversity, two binary-string representations are used, one as search query for a player (A) and one for the reference structure (gold standard) for comparison where the player is assumed to be the human user (B). The size and data of players is based on their metadata store, and their uncategorized data. For the matching operations, the following values are used:

1. a=Number of 1s in bit vector A
2. b=Number of 1s in bit vector B
3. c=Number of common 1s for A and B
4. d=All 1s in A or B which are not common (XOR)
5. n=The length of the bit-strings The Tanimoto coefficient (Tc) is the most commonly used coefficient to make any conclusion with regard to similarity using bit-string similarities.

$$T_C = \frac{c}{(a+b-c)}$$

Example #2: 4 Common Features

A: (0 1 0 1 1 1 1 1 0 0 0)
B: (1 0 1 0 1 1 1 1 0 0 0)
Tc=½
The Tanimoto diversity measure follows:

$$Diversity_{TANIMOTO} = \frac{1-c}{(a+b-c)\backslash}$$

Using this measure, players encoding metadata with only a few or a limited number of features will trend towards high diversity when compared with larger players. The Hamming measure has the inverse trend line—larger players with many metadata features will trend towards high diversity.

$$Diversity_{HAMMING} = \frac{d}{n}$$

The measure we use is based on combining complementing strengths and weaknesses for both measures of diversity called the Dixon-Koehler modification:

$$Diversity_{DK} = D_{HAMMING} D_{TANIMOTO} = \frac{d*(1-c)}{n*(a+b-c)}$$

The size effects connected to the diversity measures cancel each other in the Dixon-Koehler diversity measure. We use these measures to convert player vectors in a serialized way into a (long) binary string and can be profiled over a period of time.

In view of the above, it can be appreciated that MAP-SOUL offers a novel approach to rapidly achieve learning and classification of data in very high complexity and overcomes all traditional approaches to modeling and using the Nash Equilibrium for learning data. At a given time the learned relationships between the agents represent a graph with the agents at the vertices and the exchanges of information representing links/edges between the vertices. This graph can be captured and expressed as a surrogate ranking operator that can be used to rapidly rank the vertices in the graph, as described above for generating the SRO.

That is, MAPSOUL can be used as a system and method to learn and rank data within a network using a ranking operator. When applied to data, the ranking operator produces the rank related data. The machine learning aspect has the property of learning, mimicking, and producing weights faster than conventional approaches based on propogating computation or activiation between nodes associated in a network (as used for machine learning or associative indexing). The ranking aspect is a scalable, high-speed, approximator of the structure and inter-relationships in networks, such as those that are derived from machine learning including artificial neural networks, deep learning, and reinforcement learning, to name a few. The present disclosure can be applied in information retrieval, the activity of obtaining resources relevant to an information need from a collection of information resources. Web search engines such as Google, Bing, and Yahoo are the most well-known applications of information retrieval. The disclosure can also be applied in an information filtering system, for example a recommender system or recommendation engine that recommends content to users. The disclosure can also be used in any machine learning or artificial intelligence system for data analytics in the medical, financial, and other fields.

The system includes a process parallel framework and a unique adaptation methodology that continuously optimizes objective functions of interacting software agents. The agents converge to a Nash Equilibrium representing the contribution of each agent's reasoning paradigm (e.g., belief network, decision tree, etc.) after a batch of data is processed. The network of agents represents the best matrix for then calculating the ranking operator. This patent enables efficiency in combining multiple reasoning paradigms into a flexible, fault-tolerant system. This patent also enables efficiency and optimization of computing resources necessary for convergence of artificial neural networks, ensemble of machine learning agents (processing modules or entities), or arbitrary networks. This patent enables a system to self-tune to weak signals in poor and noisy data while processing is ongoing.

This system also includes a unique methodology for calculating the relative ranking between vertices, or nodes, in a network, for example in cybersecurity, medical informatics, social, symbolic, semantic, and Web networks. The ranking operator computes the ranking of input, or state vectors, that order the nodes with respect to each other: where the nodes can be raw data but in the preferred embodiment are agents. In other words, the ranking operator maps one state vector, which is the state represented by positions of nodes in a graph, to another state vector, which is the state represented by ranks between nodes in a subgraph. This patent enables convergence to a unique dominant eigenvector without the need for a "fudge factor" to force irreducibility, as used by PageRank. This patent also enables accuracy of a higher order for distinguishing among elements of ranked vectors. Operators are a precise and accurate construct of the underlying relational network structure. This patent enables personalization for tasks such as information retrieval, recommendation engines, to name a few.

In summary, this patent addresses the problems of efficiently building a machine learning system that combines multiple reasoning paradigms into a flexible, fault-tolerant system, and efficiently storing the learned state for use and/or re-use. We call the system: Model and Pattern Structure Online Unital Learning, or MAPSOUL.

MAP SOUL builds on the surrogate ranking operator by using economics as an organizing principle for software agents such that these agents can function as players in a game of profit, loss or break-even. Each player has a subjective model of the environment that is a set of directional probability density distributions (real and complex) over their own consequences as a function of their own action and information. In MAPSOUL, the set of subjective player beliefs does not include the true, objective distribution (i.e., an assumption of ignorance). It can be appreciated that this is a distinguishing element. Specifically, all agents are by themselves assumed to be wrong until proven correct with respect to classifying and predicting the data. In other words, all players are always assuming maximal ignorance and, therefore, inference is treated false until the absence of evidence to the contrary permits revision or commitment to an inferred hypothesis.

MAPSOUL works by randomly selecting a subset of players (processing modules) from a catalog of players who are ready and waiting. By one embodiment, the random selection of players is performed by a Genetic Algorithm. Each player is assumed to have a partially or fully incorrect subjective model. The player model is based on a set of preferences over payoff-relevant objective functions with respect to a utility function. Each player follows a strategy of optimal self-interest in which beliefs about the data or environment is assumed optimal under the set of beliefs possible. Specifically, in terms of game theory, the players are not only playing with the data, but rather also play each other, whereby they form predictions about each other from their respective point of view. The emergence of Nash Equilibrium indicates that a specific context has been induced from the data. If all contexts are induced (i.e. the set of all Nash equilibria) then the players are learning machines that have learned the correct model and they can be re-used as a deduction machine.

In summary, MAPSOUL provides a highly adaptive and generic parallel processing control model in conjunction with a runtime system for execution in the cloud (i.e. distributed computations on networks). Further, in contrast to conventional methods, MAPSOUL provides the following advantages
  irregular general-purpose computational agents or actors or players
  resource (time, memory, and cpu-consumption) elasticity, interaction, synchronization, data-transfer, locality and scheduling abstraction,
  ability to handle large sets of irregularly distributed players
  ability to handle irregularly unstructured data, and
  fault-tolerance, self-tuning and adaptive recovery.

Features of the invention can be implemented using some form of computer processor. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

Figure 4:
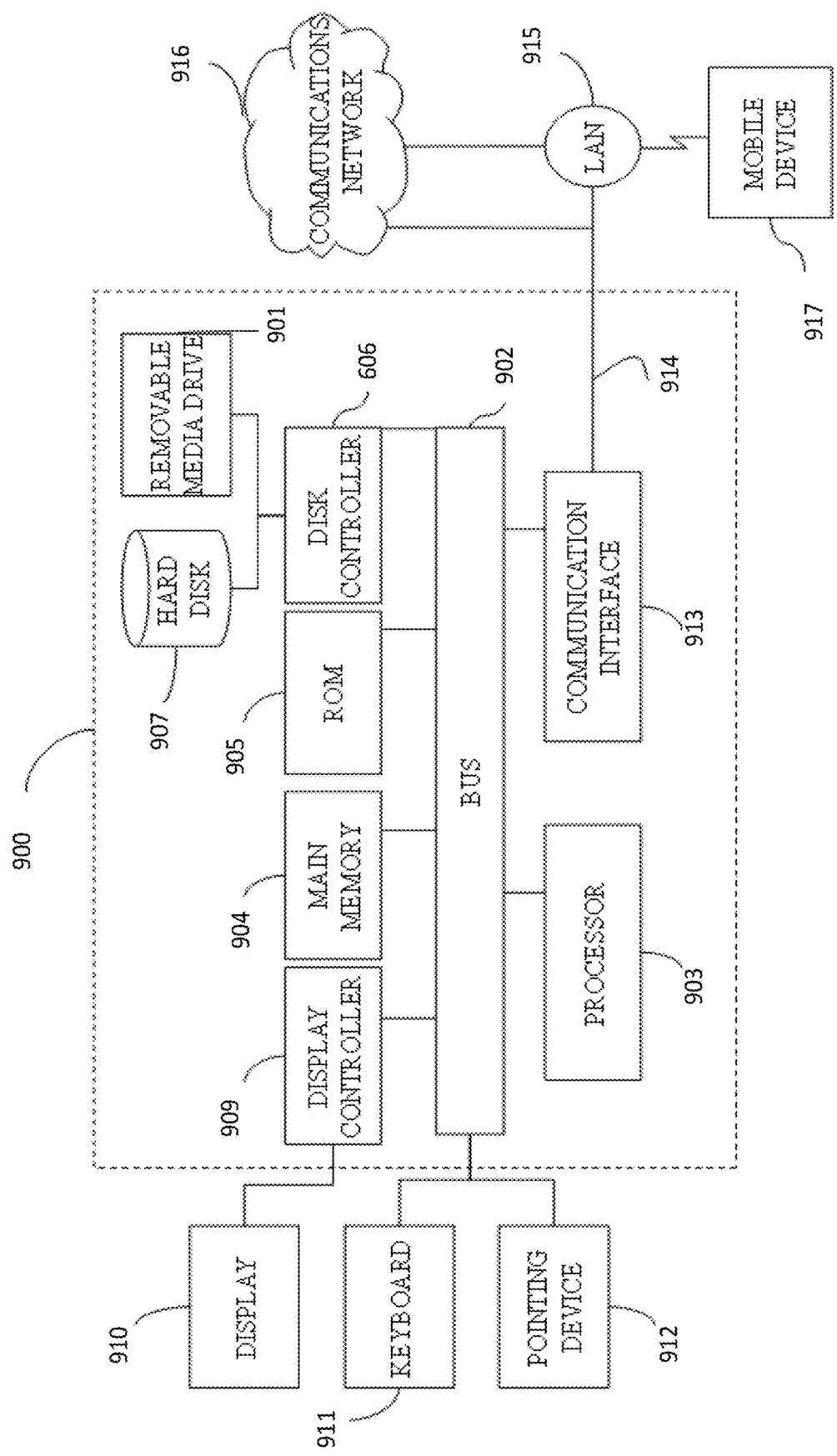
FIG. 4 shows an example of computing hardware implementing the method of ranking the network nodes based on the input ranking criteria.

In addition, the invention can be implemented using a computer based system 900, as exemplified in FIG. 4. The computer 900 includes a bus B or other communication mechanism for communicating information, and a processor/CPU 904 coupled with the bus B for processing the information. The computer 900 also includes a main memory/memory unit 903, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 904. In addition, the memory unit 903 may be used for storing temporary variables or other intermediate information during the execution of instructions by the CPU 904. The computer 900 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 904.

The computer 900 may also include a disk controller coupled to the bus B to control one or more storage devices for storing information and instructions, such as mass storage 902, and drive device 906 (e.g., floppy disk drive, read-only compact disc drive, read/write compact disc drive, compact disc jukebox, tape drive, and removable magneto-optical drive). The storage devices may be added to the computer 900 using an appropriate device interface (e.g., small computer system interface (SCSI), integrated device electronics (IDE), enhanced-IDE (E-IDE), direct memory access (DMA), or ultra-DMA).

The computer 900 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 900 may also include a display controller 909 coupled to the bus 902 to control a display, such as a cathode ray tube (CRT), for displaying information to a computer user. The computer system includes input devices, such as a keyboard 911 and a pointing device 912, for interacting with a computer user and providing information to the processor. The pointing device 912, for example, may be a mouse, a trackball, or a pointing stick for communicating direction information and command selections to the processor and for controlling cursor movement on the display. In addition, a printer may provide printed listings of data stored and/or generated by the computer system.

The computer 900 performs at least a portion of the processing steps of the invention in response to the CPU 904 executing one or more sequences of one or more instructions contained in a memory, such as the memory unit 903. Such instructions may be read into the memory unit from another computer readable medium, such as the mass storage 902 or a removable media 901. One or more processors in a multi-processing arrangement may also be employed to execute the sequences of instructions contained in memory unit 903. In alternative embodiments, hard-wired circuitry may be used in place of or in combination with software instructions. Thus, embodiments are not limited to any specific combination of hardware circuitry and software.

As stated above, the computer 900 includes at least one computer readable medium 901 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit, for driving a device or devices for implementing the invention, and for enabling the main processing unit to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 904 for execution. A computer readable medium may take many forms, including but not limited to, non-volatile media, and volatile media. Non-volatile media includes, for example, optical, magnetic disks, and magneto-optical disks, such as the mass storage 902 or the removable media 901. Volatile media includes dynamic memory, such as the memory unit 903.

Various forms of computer readable media may be involved in carrying out one or more sequences of one or more instructions to the CPU 904 for execution. For example, the instructions may initially be carried on a magnetic disk of a remote computer. An input coupled to the bus B can receive the data and place the data on the bus B. The bus B carries the data to the memory unit 903, from which the CPU 904 retrieves and executes the instructions. The instructions received by the memory unit 903 may optionally be stored on mass storage 902 either before or after execution by the CPU 904.

The computer 900 also includes a communication interface 905 coupled to the bus B. The communication interface 904 provides a two-way data communication coupling to a network 916 that is connected to, for example, a local area network (LAN), or to another communications network such as the Internet. For example, the communication interface 915 may be a network interface card to attach to any packet switched LAN. As another example, the communication interface 905 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 905 sends and receives electrical, electromagnetic or optical signals that carry digital data streams representing various types of information.

The network 916 typically provides data communication through one or more networks to other data devices. For example, the network may provide a connection to another computer through a local network 915 (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to, and the computer 900 may be, a mobile device such as a personal digital assistant (PDA) laptop computer, or cellular telephone.

While certain implementations have been described, these implementations have been presented by way of example only, and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure. The accompanying claims and their equivalents are intended to cover.

The invention claimed is:

1. A machine learning method performed using processing circuitry by a plurality of agents, the method comprising:
configuring, in a memory, which includes a non-transitory computer-readable storage, the plurality of agents, which are arranged in a network of agents with respective links between pairs of the plurality of agents, each of the links being configured to exchange information between a respective pair of the plurality of agents;
configuring, in the memory, the plurality of agents to form the network of agents, each respective agent of the plurality of agents respectively applying at least one of a plurality of approaches to machine learning as a reasoning paradigm of the respective agent, wherein the plurality of agents form the network of agents by exchanging information in accordance with a preference function, a utility function, and an objective function assigned to each of the plurality of agents, wherein each respective agent of the network of agents chooses to exchange information with another agent to optimize, with respect to a vantage point of the agent, one or more of the preference function, the utility function, and the objective function of the respective agent;
aggregating decisions of respective agents in the plurality of agents to formulate a hypothesis, wherein each respective agent of the plurality of agents uses the processing circuitry to apply the reasoning paradigm of the respective agent;

changing an exchange of information between a pair of agents of the plurality of agents, when a previous exchange of information between the pair of agents does not optimize the one or more of the preference function, the utility function, and the objective function of at least one agent of the pair of agents, wherein the changing step includes, in response to determining that the previous exchange of information between the pair of agents does not optimize the one or more of the preference function. the utility function, and the objective function of a first agent of the pair of agents, the first agent choosing to no longer exchange information with a second agent of the pair of agents, and choosing a new agent, of the plurality of agents, with which to exchange information; and revising the hypothesis based on the changed exchange of information, wherein the method further comprises each respective agent of the plurality of agents generating a respective preference vector by applying the reasoning paradigm of the respective agent to the information received by the respective agent;

processing the generated preference vectors generated for the plurality of agents to determine a similarity profile ratio, based on a corresponding goal vector, for each of the plurality of agents; and calculate, for each of the plurality of agents, the utility function, based on the determined similarity profile ratio.

2. The machine learning method of claim 1, wherein each agent in the pair of agents uses a different one of the plurality of approaches to machine learning.

* * * * *